(12) United States Patent
Sabatelli et al.

(10) Patent No.: US 9,002,380 B2
(45) Date of Patent: Apr. 7, 2015

(54) PROXIMITY-BASED NOTIFICATIONS IN A MOBILE DEVICE

(75) Inventors: Alessandro F. Sabatelli, San Francisco, CA (US); Ronald K. Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/492,759

(22) Filed: Jun. 8, 2012

(65) Prior Publication Data

US 2013/0331127 A1 Dec. 12, 2013

(51) Int. Cl.
*H04W 24/00* (2009.01)
*H04W 4/02* (2009.01)
*H04W 4/20* (2009.01)

(52) U.S. Cl.
CPC ............ *H04W 4/023* (2013.01); *H04W 4/021* (2013.01); *H04W 4/206* (2013.01)

(58) Field of Classification Search
CPC ........ H04W 4/021; H04W 4/02; H04W 4/027
USPC ................. 455/456.1–456.6, 435.1, 414.1; 370/254, 338
See application file for complete search history.

(56) References Cited

U.S. PATENT DOCUMENTS

| | | | |
|---|---|---|---|
| 6,618,593 B1 * | 9/2003 | Drutman et al. | 455/456.3 |
| 7,289,814 B2 | 10/2007 | Amir et al. | |
| 2004/0198379 A1 * | 10/2004 | Magee et al. | 455/456.1 |
| 2004/0198398 A1 * | 10/2004 | Amir et al. | 455/456.6 |
| 2005/0130634 A1 * | 6/2005 | Godfrey | 455/414.1 |
| 2006/0148532 A1 * | 7/2006 | Schnurr | 455/567 |
| 2008/0182591 A1 * | 7/2008 | Krikorian | 455/456.3 |
| 2008/0318561 A1 * | 12/2008 | Olshansky et al. | 455/417 |
| 2009/0005040 A1 * | 1/2009 | Bourne | 455/435.1 |
| 2009/0030999 A1 | 1/2009 | Gatzke et al. | |
| 2010/0057481 A1 * | 3/2010 | Fein et al. | 705/1 |
| 2010/0203901 A1 * | 8/2010 | Dinoff et al. | 455/456.3 |
| 2010/0233999 A1 * | 9/2010 | Loeb et al. | 455/414.1 |
| 2011/0238755 A1 | 9/2011 | Khan et al. | |
| 2012/0008526 A1 * | 1/2012 | Borghei | 370/254 |
| 2012/0088524 A1 | 4/2012 | Moldavsky et al. | |
| 2012/0252498 A1 * | 10/2012 | Trinchero et al. | 455/456.3 |
| 2012/0281686 A1 * | 11/2012 | Pollari | 370/338 |
| 2012/0289254 A1 * | 11/2012 | Dishneau | 455/456.3 |
| 2012/0296984 A1 * | 11/2012 | Khan | 709/206 |
| 2013/0046602 A1 * | 2/2013 | Grigg et al. | 705/14.25 |

FOREIGN PATENT DOCUMENTS

WO 2009/101629 5/2009

OTHER PUBLICATIONS

International Search Report and Written Opinion of the International Searching Authority, PCT Application Serial No. PCT/US2013/044644, Sep. 27, 2013, 16 pp.

* cited by examiner

*Primary Examiner* — Nathan Taylor
(74) *Attorney, Agent, or Firm* — Fish & Richardson P.C.

(57) ABSTRACT

Methods, program products, and systems for proximity-based notifications are described. A proximity-based notification system can receive a request to be notified when a contact's mobile device is in proximity to a user's mobile device, obtain permission to receive information associated with the contact, receive the information associated with the contact, detect that the contact's mobile device is in proximity to the user's mobile device based on the information associated with the contact, and notify the user that the contact's mobile device is in proximity to the user's mobile device.

21 Claims, 7 Drawing Sheets

PROXIMITY-BASED NOTIFICATIONS IN A MOBILE DEVICE

TECHNICAL FIELD

This disclosure relates generally to proximity-based notifications in a mobile device.

BACKGROUND

A user can configure a mobile device to notify the user that a task needs to be performed or an event is going to happen. Each task or event can be associated with a date. As the date approaches, the device can provide a notification to the user, for example, by presenting an alert dialog box.

SUMMARY

Methods, program products, and systems for proximity-based operations of a mobile device are disclosed. A user's mobile device can receive input specifying that a notification be presented when a contact's mobile device is in proximity to the user's mobile device. When the user's mobile device detects that the contact's mobile device is in proximity to the user's mobile device, the user's mobile device can present a notification to the user.

Proximity-based notifications can be implemented to achieve the following advantages. Compared to conventional notifications, proximity-based notifications can give a user more options when setting up a notification. For example, a user can set up a notification that is triggered when the user meets a contact, without specifying a date or a time for the notification.

The details of one or more implementations of proximity-based notifications are set forth in the accompanying drawings and the description below. Other features, aspects, and advantages will become apparent from the description, the drawings, and the claims.

DETAILED DESCRIPTION

Exemplary System for Proximity-Based Notifications

Figure 1:
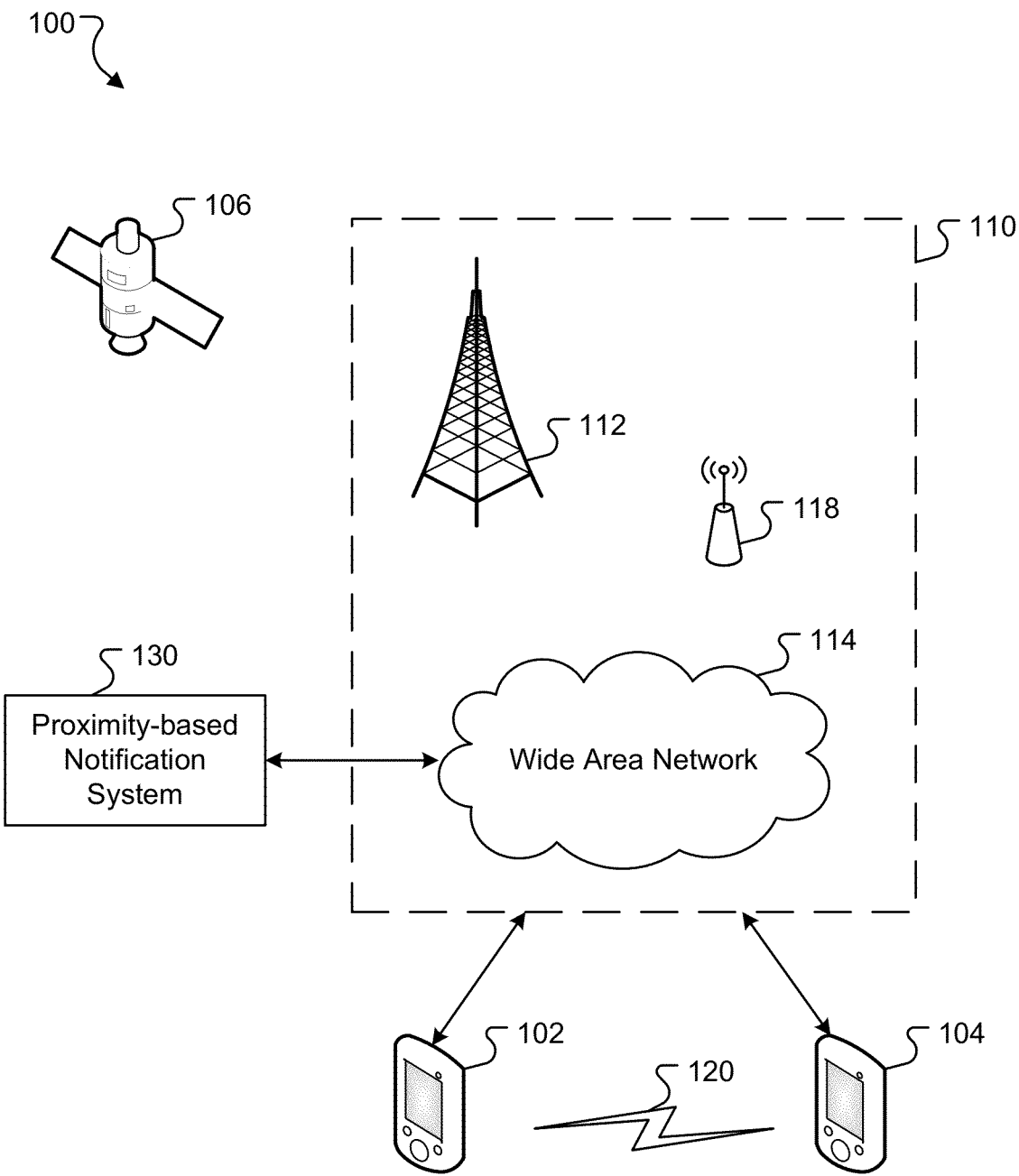
FIG. 1 is a diagram that provides an overview of an exemplary system for proximity-based notifications.

FIG. 1 is a diagram that provides an overview of an exemplary system 100 for proximity-based notifications. The system 100 can include a user's mobile device 102 and a contact's mobile device 104. The mobile device 102 or 104 can be, for example, handheld computers, personal digital assistants, cellular telephones, smart phones, enhanced general packet radio service (EGPRS) mobile phones, media players, navigation devices, or a combination of any two or more of these data processing devices or other data processing devices.

The mobile device 102 or 104 can communicate with one or more wired and/or wireless networks 110. For example, the mobile device 102 or 104 can communicate with a cellular network using a cellular tower transceiver 112. The cellular network can provide communication access to a wide area network (WAN) 114, such as the Internet, by use of a gateway (not shown). The mobile device 102 or 104 can receive and store network information, such as the cell ID of the cellular tower transceiver 112 (e.g., transceivers on GSM masts), associated with the cellular network.

Similarly, the mobile device 102 or 104 can communicate with an access point transceiver 118, such as an 802.11g wireless access device. The access point transceiver 118 can provide communication access to the wide area network 114. The mobile device 102 or 104 can receive and store network information, such as the access point transceiver ID of the access point transceiver 118 (e.g., a Media Access Control (MAC) address), associated with the access point.

The mobile device 102 or 104 may include circuitry and sensors for supporting a location determining capability, such as that provided by a Global Positioning System (GPS). In some implementations, a positioning system, such as a GPS receiver, can be integrated into the mobile device 102 or 104 to provide access to location information. The mobile device 102 or 104 can communicate with a GPS satellite 106 through the GPS receiver to determine its position, location, or geographic area.

The mobile device 102 or 104 can communicate with a proximity-based notification system 130 over the one or more wired and/or wireless networks 110. The proximity-based notification system 130 can provide user interfaces for configuring or presenting notifications to the user of the mobile device 102. The mobile device 102 or 104 can provide network information and/or location information to the proximity-based notification system 130. Although depicted as a separate entity, the proximity-based notification system 130 can, in some implementations, be part of the user's mobile device 102.

There are a variety of ways in which the proximity-based notification system 130 can facilitate the determination of proximity of mobile devices. In some implementations, the proximity-based notification system 130 can determine whether the contact's mobile device 104 is in proximity to the user's mobile device 102. In some implementations, the proximity-based notification system 130 can provide the contact's network and/or location information to the user's mobile device 102, and the user's mobile device 102 can use the contact's network and/or location information to determine whether the contact's mobile device 104 is in proximity to the user's mobile device 102.

The mobile devices 102 and 104 can establish direct communication with each other. For example, the mobile devices 102 and 104 can establish a peer-to-peer connection 120, such as a personal area network connection, by use of one or more communication subsystems, such as a Bluetooth communication device. The user's mobile device 102 can use the peer-to-peer connection 120 with the contact's mobile device 104 to determine that the contact's mobile device 104 is in proximity to the user's mobile device 102. Other communication protocols and topologies can also be implemented.

Exemplary Systems for Determining Proximity of Mobile Devices

Figure 2:
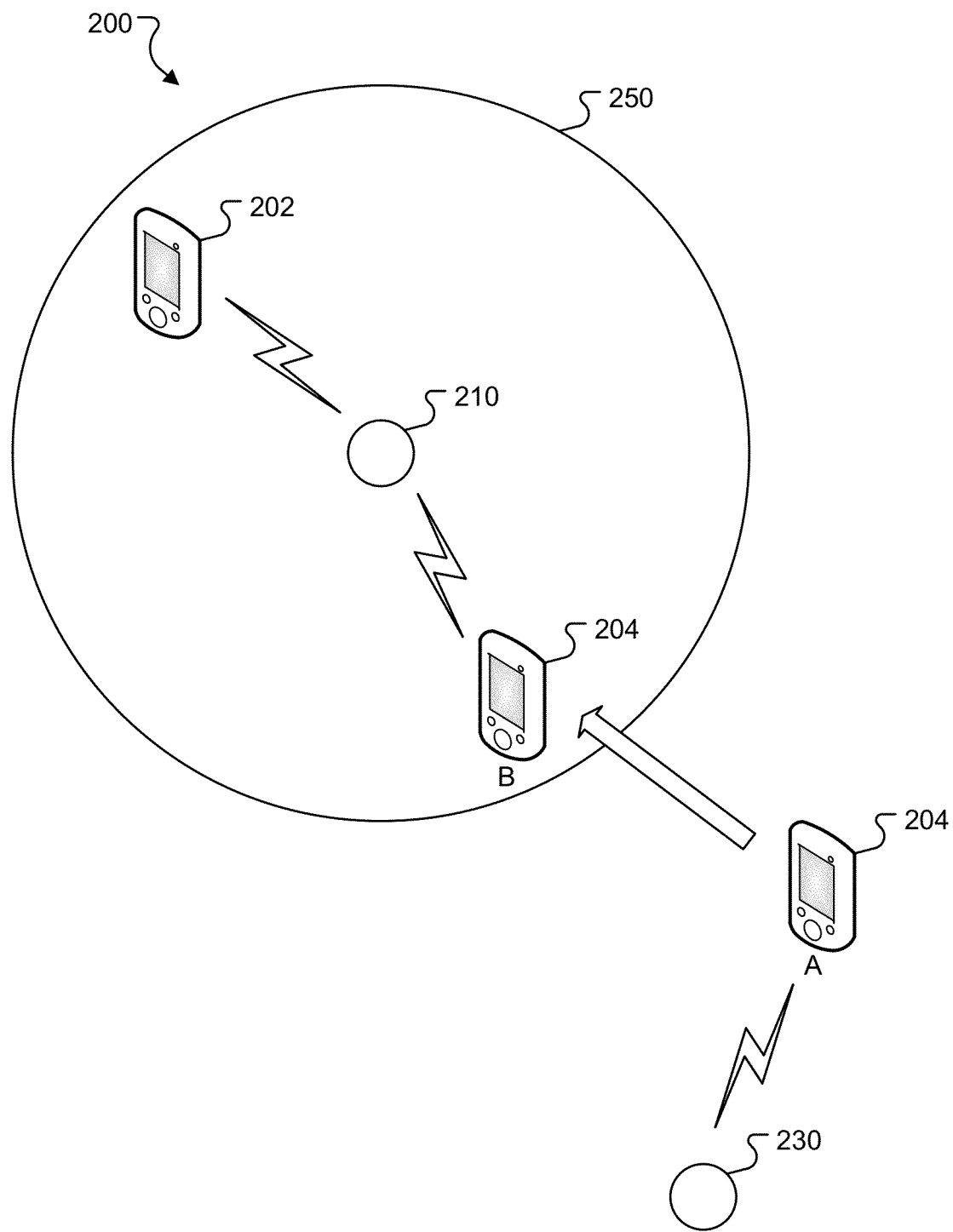
FIGS. 2-4 illustrate exemplary systems for determining proximity of mobile devices.
Figure 3:
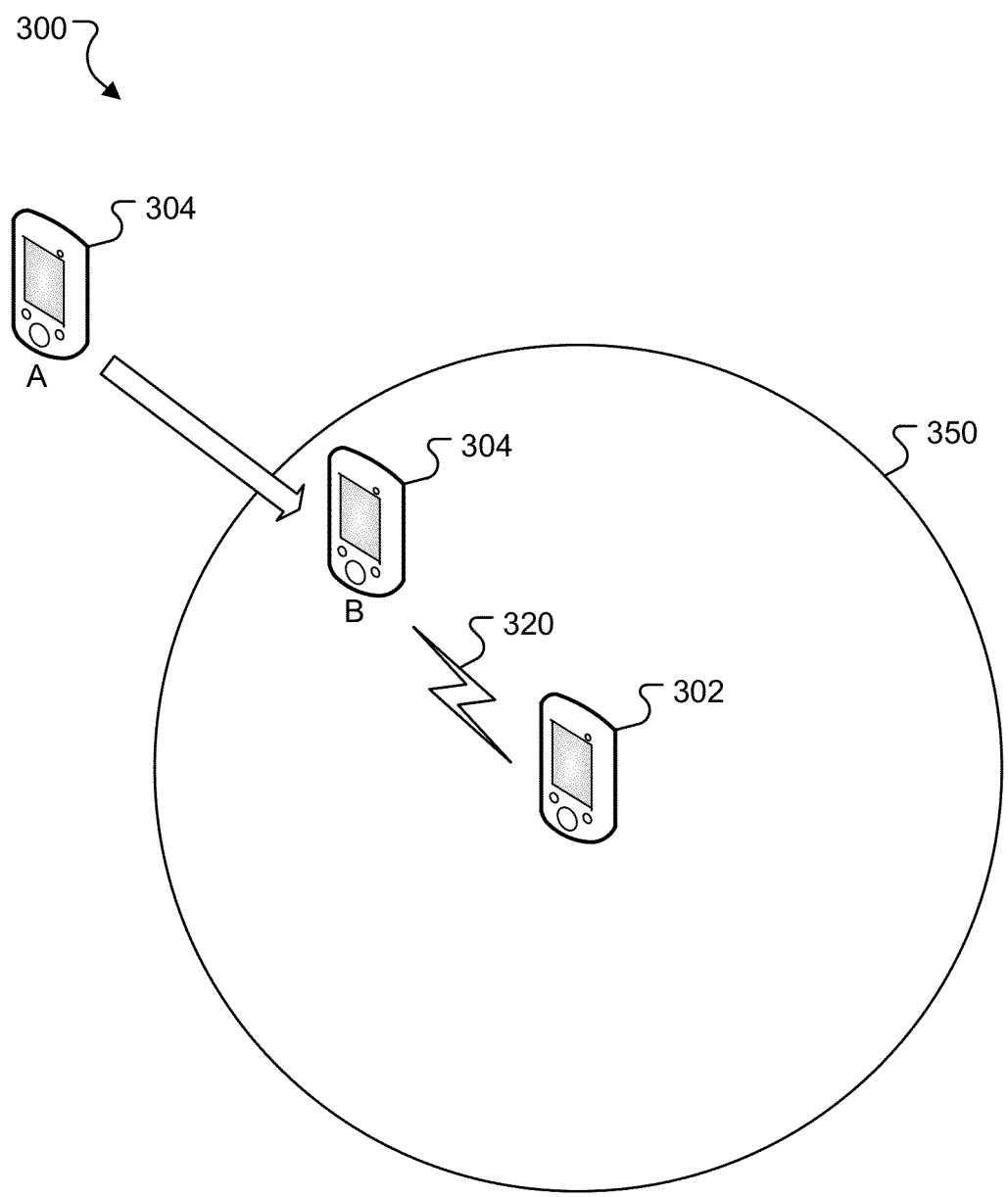
Figure 4:
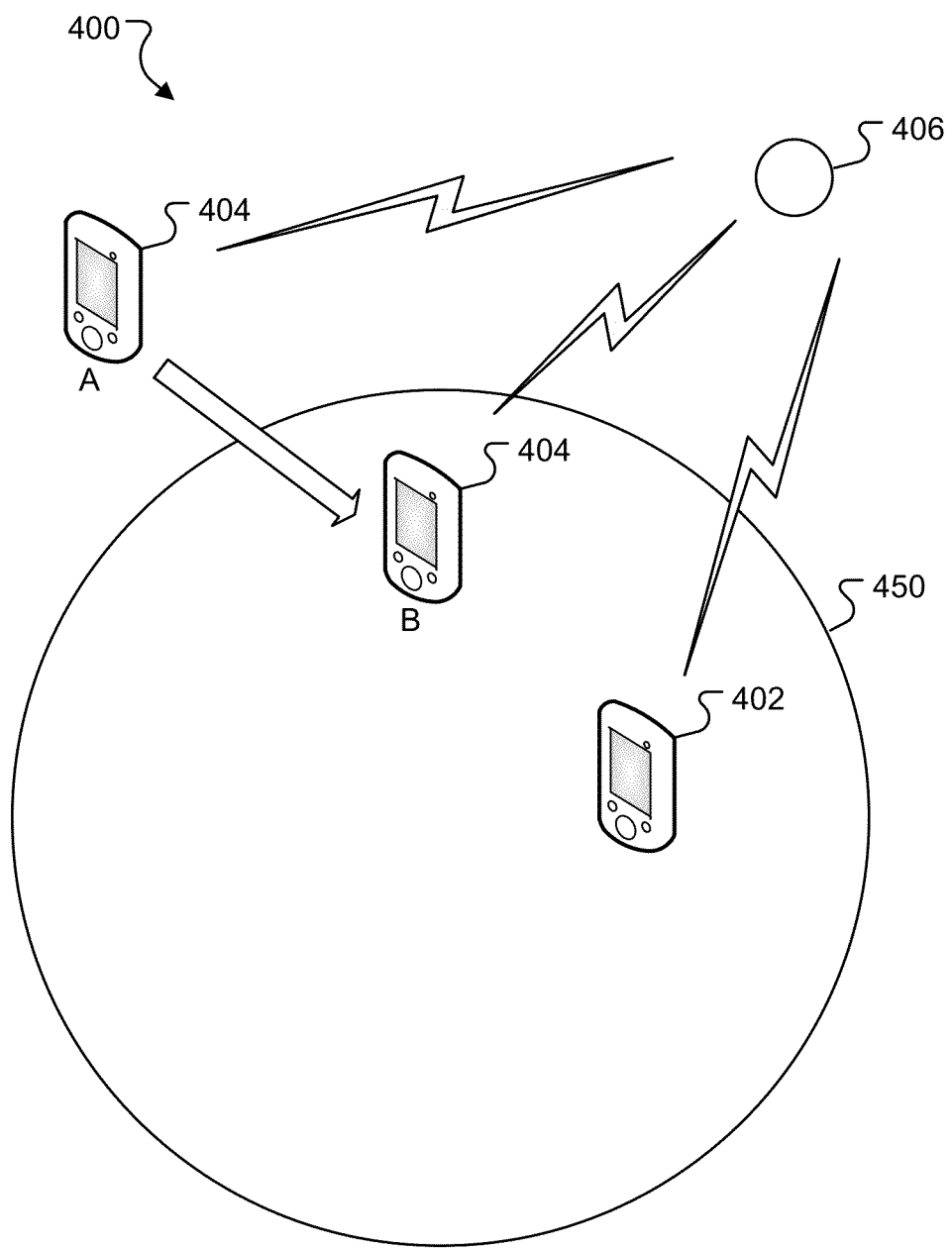

FIGS. 2-4 illustrate exemplary systems for determining proximity of mobile devices. FIG. 2 illustrates a system 200 for determining proximity of mobile devices based on the mobile devices being connected to the same transceiver. FIG. 3 illustrates a system 300 for determining proximity of mobile devices based on the mobile devices establishing a connection directly with each other. FIG. 4 illustrates a system 400 for determining proximity of mobile devices based on the geographic locations of the mobile devices being within a "geo-fence" that is generated based on context of the user or the contact.

FIG. 2 illustrates a system 200 for determining proximity of mobile devices based on the mobile devices being connected to the same transceiver. In FIG. 2, the system 200 includes a user's mobile device 202, a contact's mobile device 204, and a transceiver 210. The transceiver 210 may be, for example, the cellular tower transceiver 112 or the access point transceiver 118 of FIG. 1. The transceiver 210 is associated with a communication range 250.

The user's mobile device 202 is within the communication range 250 of the transceiver 210 and is in communication with the transceiver 210. The user's mobile device 202 receives network information associated with the transceiver 210, such as a transceiver ID. The user's mobile device 202 provides the network information to a proximity-based notification system, and the proximity-based notification system stores a temporal identifier for the user or the user's mobile device and the network information.

Initially, the contact's mobile device 204 is located at location A and is in communication with a transceiver 230. Location A is outside the communication range 250 of the transceiver 210, and the contact's mobile device 204 is not in communication with transceiver 210. The contact's mobile device 204 receives network information associated with the transceiver 230. The contact's mobile device 204 provides the network information to the proximity-based notification system.

In response to receiving the network information associated with the contact's mobile device 204, the proximity-based notification system compares the network information associated with the contact's mobile device 204 with the network information associated with the user's mobile device 202 and determines that the network information associated with the contact's mobile device 204 does not match the network information associated with the user's mobile device 202. Based on this comparison, the proximity-based notification system determines that the contact's mobile device 204 is not in proximity to the user's mobile device 202.

When the contact's mobile device 204 moves to location B, the contact's mobile device 204 is within the communication range 250 of the transceiver 210 and establishes communication with the transceiver 210. The contact's mobile device 204 receives network information associated with the transceiver 210, such as a cell ID of a cellular tower transceiver (e.g., transceivers on GSM masts) associated with a cellular network or an access point transceiver ID of the access point transceiver (e.g., a Media Access Control (MAC) address) associated with an access point. The contact's mobile device 204 provides the network information to the proximity-based notification system.

In response to receiving the network information associated with contact's mobile device 204, the proximity-based notification system compares the network information associated with the contact's mobile device 204 with the network information associated with the user's mobile device 202 and determines that the network information associated with the contact's mobile device 204 matches the network information associated with the user's mobile device 202. Based on this comparison, the proximity-based notification system determines that the contact's mobile device 204 is in proximity to the user's mobile device 202.

FIG. 3 illustrates a system 300 for determining proximity of mobile devices based on the mobile devices establishing a connection directly with each other. In FIG. 3, the system 300 includes a user's mobile device 302 and a contact's mobile device 304. The mobile devices 302 and 304 can establish direct communication with each other. For example, the mobile devices 302 and 304 can establish a peer-to-peer connection 320, such as a personal area network connection, by use of one or more communication subsystems, such as a Bluetooth communication device. The user's mobile device 302 is associated with a direct communication range 350.

Initially, the contact's mobile device 304 is located at location A. Location A is outside the direct communication range 350 of the user's mobile device 302, and the user's mobile device 302 and the contact's mobile device 304 cannot establish a direct connection with each other. When the contact's mobile device 304 moves to location B, the contact's mobile device 304 is within the direct communication range 350 of the user's mobile device 302. The user's mobile device 302 discovers the presence of the contact's mobile device 304 within the direct communication range 350 and determines that the contact's mobile device 304 is in proximity to the user's mobile device 302. The user's mobile device 302 can measure the signal strength of the connection with the contact's mobile device 304 to determine a distance between the user and the contact.

FIG. 4 illustrates a system 400 for determining proximity of mobile devices based on the geographic locations of the mobile devices being within a geo-fence that is generated based on context of the user or the contact. A geo-fence may be a virtual perimeter for a real-world geographic area. A geo-fence may be dynamically generated around a current location of a user of a mobile device.

In FIG. 4, the system 400 includes a user's mobile device 402, a contact's mobile device 404, and a positioning system 406. The positioning system 406 can include, for example, satellite based positioning systems, such as GPS, cellular network positioning based on cellular tower IDs, WiFi positioning technology based on WiFi networks, or any other technology that can be used to provide the actual or estimated location of a mobile device.

The user's mobile device 402 determines its current geographic location by communicating with the positioning system 406. The user's mobile device 402 provides its current geographic location to the proximity-based notification system. The proximity-based notification system stores a temporal identifier for the user or the user's mobile device 402 and the user's current location. Based on the user's current location and other context information associated with the user, the proximity-based notification system generates a geo-fence 450 to include the user's current location and an area surrounding the user's current location. The proximity-based notification system may monitor the user's movements and changes in context, and adjust the geo-fence 450 based on the user's movements and changes in context.

Initially, the contact's mobile device 404 is located at location A. The contact's mobile device 404 determines its current geographic location by communicating with the positioning system 406. The contact's mobile device 404 provides its current geographic location to the proximity-based notification system.

In response to receiving the contact's current location, the proximity-based notification system determines that the contact's current location is not within the geo-fence 450. The proximity-based notification system may determine whether to adjust the geo-fence 450 to include the contact's current location based on context information associated with the contact or the user. In the scenario of FIG. 4, the user's mobile device 402 or the proximity-based notification system determines not to adjust the geo-fence 450 to include the contact's current location. The user's mobile device 402 or the proximity-based notification system determines that the contact's mobile device 404 is not in proximity to the user's mobile device 402.

As the contact's mobile device 404 moves from location A to location B, the contact's mobile device 404 may periodically provide an update of its current location to the proximity-based notification system. In some implementations, the proximity-based notification system determines that the contact's mobile device 404 is in proximity to the user's mobile device 402 when the proximity-based notification system detects that the contact's mobile device 404 has entered the geo-fence 450 based on the contact's updated location. In some implementations, the proximity-based notification system determines that the contact's mobile device 404 is in proximity to the user's mobile device 402 when the proximity-based notification system determines to adjust the geo-fence 450 to include the contact's updated location based on context information associated with the contact or the user.

The geo-fence 450 may be generated based on context of the user or the contact or both. The geo-fence 450 can be dynamically adjusted according to changes in the context of the user or the contact or both. The geo-fence 450 can be generated, stored, and modified by the proximity-based notification system.

Context of an individual can include any conditions or circumstances associated with the individual. The individual's mobile device may provide information associated with the context to the proximity-based notification system to facilitate creation and modification of a geo-fence. Information associated with the context can include device or network related information, such as the individual's device or network configuration, capabilities, or status. The information can include location related information, such as the individual's current location, population density associated with the user's current location, property boundaries associated with the user's current location, or the distance between the individual's current location and another location. The information can include travel related information, such as the individual's direction of travel, speed of travel, travel destination, or available travel routes between the individual's location and another location. In general, the context information can include any information related to the conditions or circumstances associated with the individual.

The proximity-based notification system may analyze the context information of the user to generate or modify the geo-fence around the user. For example, the geo-fence may include a smaller area around the user when the user is at a location associated with a high population density and a larger area around the user when the user is at a location associated with a low population density. Similarly, the geo-fence may include smaller area when the user is moving at a slow speed, e.g., a speed indicative of walking, and a larger area when the user is moving at a fast speed, e.g., the speed of a moving car. As another example, the geo-fence may lie along property boundaries if the user is located on or in a property with boundaries, such as a building, an amusement park, a shopping center, an airport, etc. Similarly, the geo-fence may lie along metropolitan area boundaries, such as a neighborhood boundary, a community boundary, a city boundary, a county boundary, or a state boundary. As yet another example, the geo-fence may include an area along and near the user's travel route.

The proximity-based notification system may analyze the context information of the user and the contact to generate or modify the geo-fence around the user. For example, the proximity-based notification system may monitor the movements and context of the user and the contact over a period of time. Based on the movement and context information, the proximity-based notification service may determine that the user and the contact reside within five miles of each other. The proximity-based notification system may adjust the geofence as the user moves around the area near his home so as to not include the contact's home.

As another example, the proximity-based notification system may determine the available routes and distance between the user and the contact based on the user's and the contact's current locations. If the available routes and the distance are such that the user and the contact could meet within a certain period of time, the proximity-based notification system may generate or adjust the geo-fence to include the contact's current location and determine that the contact is in proximity to the user.

Exemplary Process for Providing Proximity-Based Notifications

Figure 5:
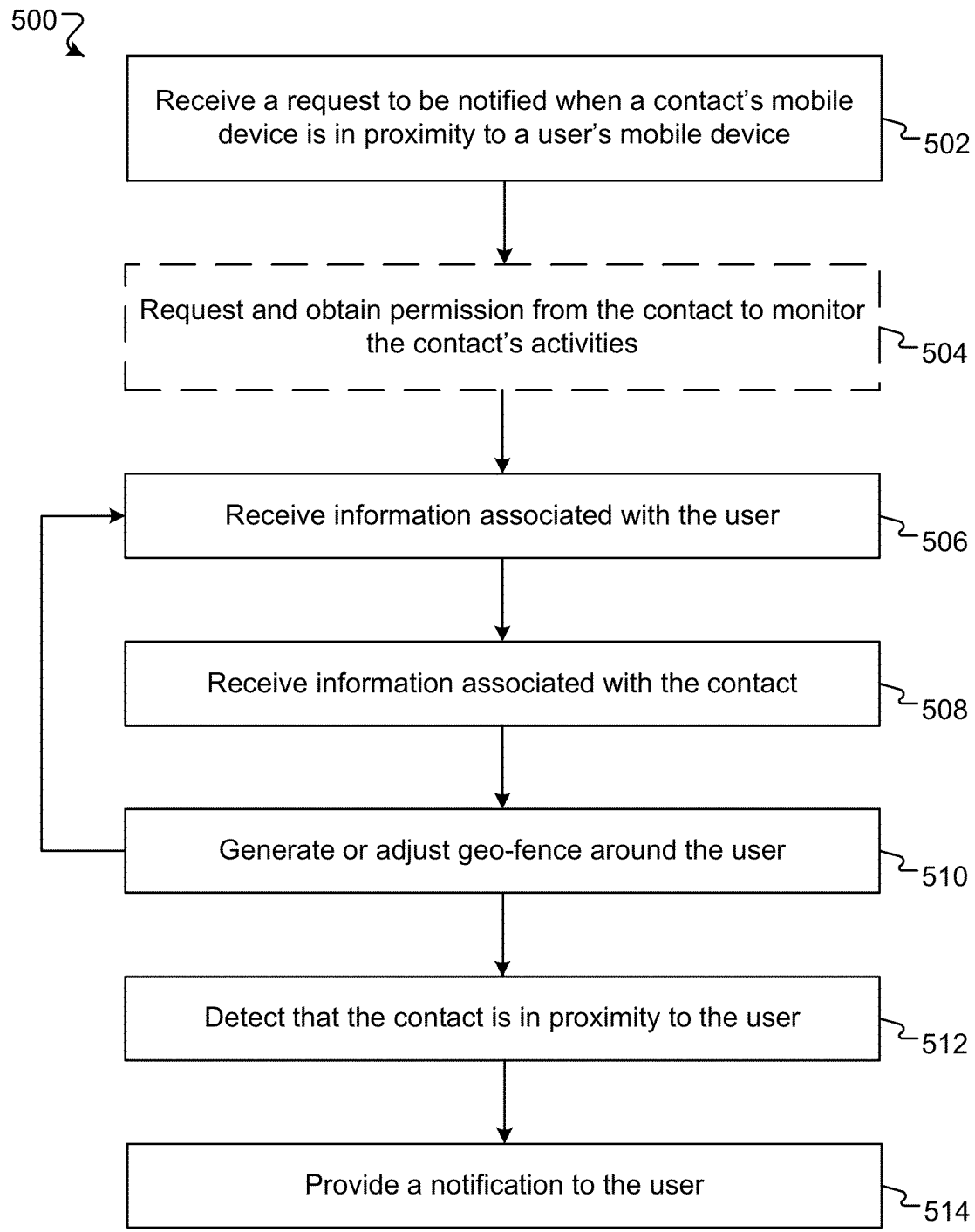
FIG. 5 illustrates an exemplary process for providing proximity-based notifications to a user of a mobile device.

FIG. 5 illustrates an exemplary process 500 for providing proximity-based notifications to a user of a mobile device. Process 500 can be performed by a proximity-based notification system, e.g., the proximity-based notification system 130 in FIG. 1, that is incorporated into a system having the architecture described in reference to FIG. 6 or a user device having the architecture described in reference to FIG. 7.

The proximity-based notification system can receive a request to notify a user when a contact's mobile device is in proximity to the user's mobile device (502). The request may be in the form of an input by the user specifying that a notification be presented when the contact is in proximity to the user. The request may be received from an application. For example, the user may create a task using a calendar application and configure the task to be triggered by the proximity-based notification system detecting that the contact is in proximity to the user. As another example, the user may record a reminder using a voice recorder application and configure the reminder to be played back to the user when the proximity-based notification system detects that the contact is in proximity to the user.

In some implementations, the proximity-based notification system can request and obtain permission from the contact to monitor the contact's context and location, and the contact's mobile device network connections (504). To request permission, the proximity-based notification system may cause the contact's mobile device to present a prompt or message to the contact. The message may indicate that a user is requesting to be notified when the contact is near the user and may include the identity of the user. The message may provide selections for the contact to configure what type of information, e.g., context, location, or network information, to share with the proximity-based notification system. The message can provide selections for the contact to give permission or not give permission to the proximity-based notification system to monitor the contact's activities.

The proximity-based notification system can receive information associated with the user (506) and information associated with the contact (508). The information can include context information, location information, or network information. In some implementations, a mobile device may constantly provide the information to the proximity-based notification service while the device is running a proximity-based notification application. In some implementations, a mobile device may push the information to the proximity-based notification system when the device detects a significant event, such as a user logging into a proximity-based notification application, a user entering or exiting an area covered by a transceiver, a user changing a travel route, etc. In some implementations, the proximity-based notification system may periodically pull the information from a mobile device at predetermined time intervals, e.g., thirty seconds, one second, one minute, etc.

The proximity-based notification system can generate or adjust a geo-fence around the user based on the information (510). In some implementations, the geo-fence may include the area within the maximum communication range of a peer-to-peer communication subsystem, such as a Bluetooth communication device, in the user's mobile device. In some implementations, the geo-fence may include an area within the communication range of a transceiver that is in communication with the user's mobile device. In some implementations, the geo-fence may be generated or adjusted based on location and/or context information associated with the user. The proximity-based notification system can repeatedly receive information and adjust the geo-fence around the user based on the information.

The proximity-based notification system can detect that the contact is in proximity to the user (512). In some implementations, the proximity-based notification system determines that the contact is in proximity to the user when the user's mobile device detects the presence of the contact's mobile device through a direct connection, such as a Bluetooth connection. In some implementations, the proximity-based notification system determines that the contact is in proximity to the user when the user's mobile device and the contact's mobile device are connected to the same transceiver, e.g., a cellular tower transceiver or an access point transceiver. In some implementations, the proximity-based notification system determines that the contact is in proximity to the user when the contact's current location is within the geo-fence generated based on information received from the user's mobile device and the contact's mobile device.

In response to detecting that the contact is in proximity to the user, the proximity-based notification system provides a notification to the user (514). The notification may be, for example, an alert box dialog, an audio notification (e.g., a ringtone or a pre-recorded message), or a vibration alert. The notification may present a message to the user to notify the user that the contact is nearby. The notification may present a reminder to the user to perform a task when the user meets the contact.

The notification may include a map that displays the area within the geo-fence, the current location of the user, and the current location of the contact. The map may adjust to the area defined by the geo-fence as the geo-fence is generated or modified. The map may include an indicator indicating a travel route from the user to the contact. The travel route can be indicated, for example, by a line from the user to the contact.

Exemplary System Architecture

Figure 6:
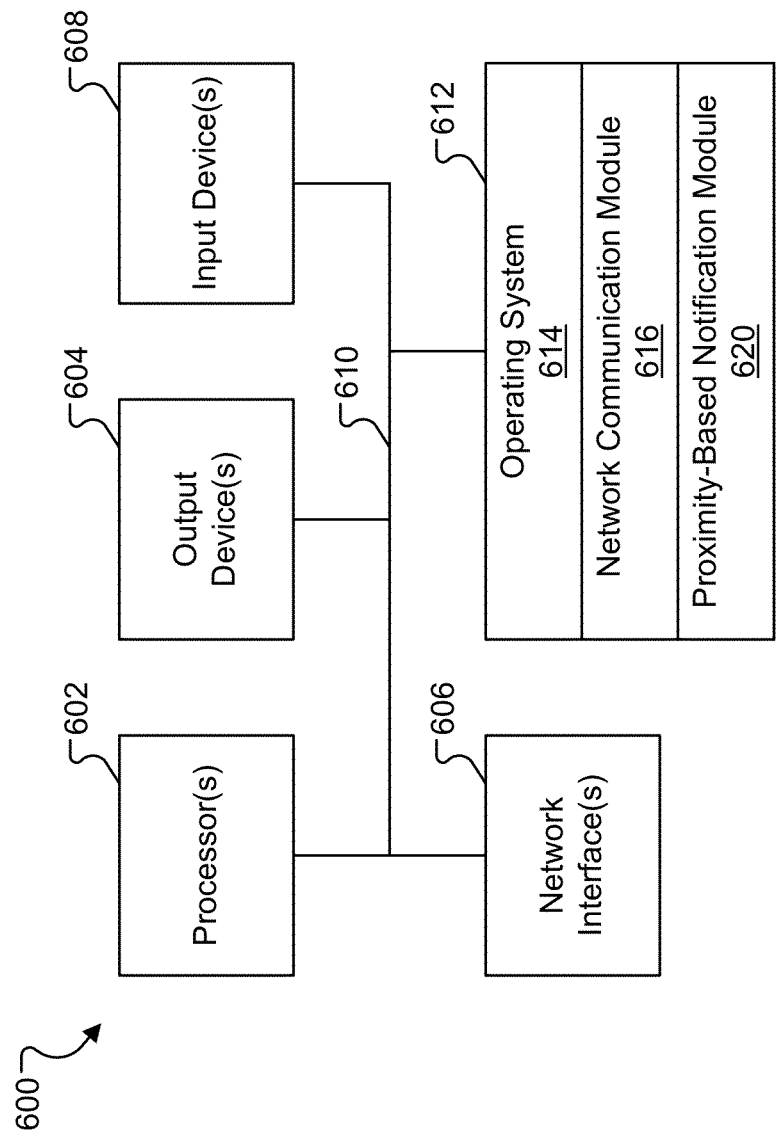
FIG. 6 is a block diagram of an exemplary system architecture for implementing the features and operations of proximity-based notifications.

FIG. 6 is a block diagram of an exemplary system architecture 600 for implementing the features and operations of proximity-based notifications. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable media 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to any medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 612 can further include operating system 614 (e.g., Mac OS® server, Windows® NT server), network communications module 616, and proximity-based notification module 620. Proximity-based notification module 620 can be programmed to receive an input for a proximity-based notification. Operating system 614 can be multi-user, multiprocessing, multitasking, multithreading, real time, etc. Operating system 614 performs basic tasks, including but not limited to recognizing input from and providing output to devices, keeping track and managing files and directories on computer-readable media 612 (e.g., memory or a storage device), controlling peripheral devices, and managing traffic on the one or more communication channels 610. Network communications module 616 includes various components for establishing and maintaining network connections (e.g., software for implementing communication protocols, such as TCP/IP, HTTP, etc.). Computer-readable medium 612 can further include a database interface. The database interface can include interfaces to one or more databases on a file system. The databases can be organized under a hierarchical folder structure, the folders mapping to directories in the file system.

Architecture 600 can be included in any device capable of hosting a database application program. Architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

Exemplary Mobile Device Architecture

Figure 7:
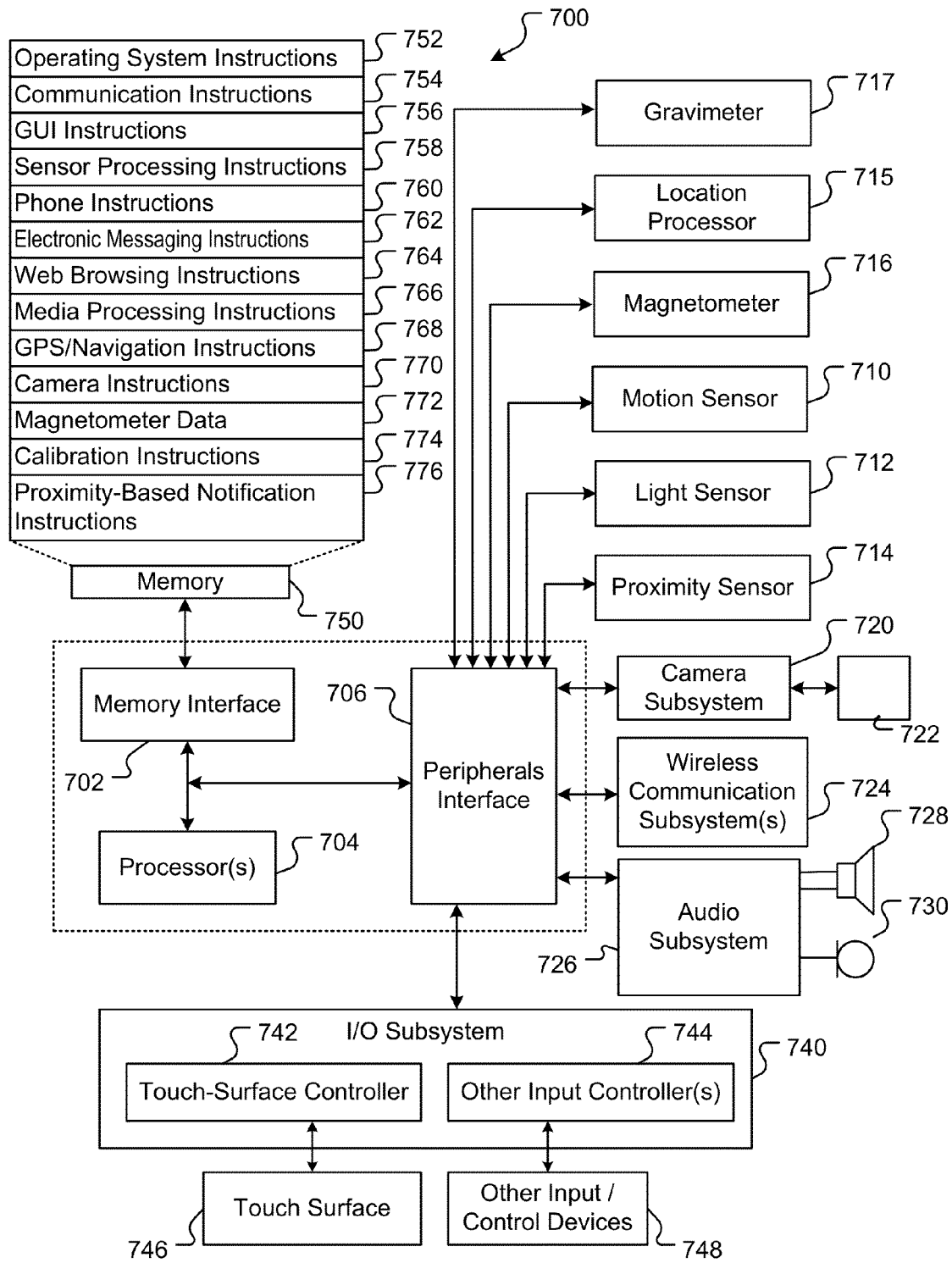
FIG. 7 is a block diagram of an exemplary implementation of a mobile device.

FIG. 7 is a block diagram 700 of an exemplary implementation of a mobile device. A mobile device can include memory interface 702, one or more data processors, image processors and/or processors 704, and peripherals interface 706. Memory interface 702, one or more processors 704 and/or peripherals interface 706 can be separate components or can be integrated in one or more integrated circuits. Processors 704 can include one or more application processors (APs) and one or more baseband processors (BPs). The application processors and baseband processors can be integrated in one single process chip. The various components in a mobile device, for example, can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass. Motion sensor 710 can include one or more accelerometers configured to determine change of speed and direction of movement of the mobile device. Gravimeter 717 can include one or more devices connected to peripherals interface 706 and configured to measure a local gravitational field of Earth.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which a mobile device is intended to operate. For example, a mobile device can include communication subsystems 724 designed to operate over a CDMA system, a WiFi™ or WiMax™ network, and a Bluetooth™ network. In particular, the wireless communication subsystems 724 can include hosting protocols such that the mobile device can be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include touch surface controller 742 and/or other input controller(s) 744. Touch-surface controller 742 can be coupled to a touch surface 746 (e.g., touch screen or pad). Touch surface 746 and touch surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch surface 746 (e.g., a touch screen); and a pressing of the button for a second duration that is longer than the first duration may turn power to a mobile device on or off. The user may be able to customize a functionality of one or more of the buttons. The touch surface 746 can, for example, also be used to implement virtual or soft buttons and/or a keyboard.

In some implementations, a mobile device can present recorded audio and/or video files, such as MP3, AAC, and MPEG files. In some implementations, a mobile device can include the functionality of an MP3 player. A mobile device may, therefore, include a pin connector. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. The memory 750 may also store other software instructions (not shown), such as security instructions, web video instructions to facilitate web video-related processes and functions, and/or web-shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. Memory 750 can include proximity-based notification instructions 776. Proximity-based notification instructions 776 can be a computer program product that is configured to cause the mobile device to perform operations of configuring or presenting proximity-based notifications.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

A number of implementations of the invention have been described. Nevertheless, it will be understood that various modifications can be made without departing from the spirit and scope of the invention.

What is claimed is:

1. A computer-implemented method comprising:
receiving a request from a first mobile device to be notified when a contact's mobile device is in proximity to the first mobile device;
obtaining permission to receive information associated with the contact; receiving a first location corresponding to a current location of the first mobile device;
receiving a second location corresponding to a current location of the contact's mobile device;
estimating, based on the first location and the second location, an amount of time needed for the first mobile device to travel to a location of the contact's mobile device;
determining that the contact's mobile device is in proximity to the first mobile device, including: defining a geefence based on a current location of the first mobile device, a speed of travel associated with the current location of the first mobile device, a direction of travel associated with the current location of the first mobile device, a distance between the first mobile device and the contact's mobile device, and a travel route of the first mobile device, and detecting that the contact's mobile device is within the geo-fence when the amount of time is less than a threshold period of time; and
notifying the first mobile device that the contact's mobile device is in proximity to the first mobile device.

2. The method of claim 1, wherein the information associated with the contact comprises at least one of location information, device information, or context information.

3. The method of claim 1, comprising estimating, based on a distance between the first location and the second location, an amount of time needed for the first mobile device to travel to a location of the contact's mobile device based on available routes connecting the first mobile device to the contact's mobile device.

4. The method of claim 1, comprising estimating, based on a distance between the first location and the second location, an amount of time needed for the first mobile device to travel to a location of the contact's mobile device based on a distance between the first mobile device and the contact's mobile device.

5. The method of claim 1, wherein the proximity is based on a direction of travel of the contact's mobile device.

6. The method of claim 1, comprising estimating, based on a distance between the first location and the second location, an amount of time needed for the first mobile device to travel to a location of the contact's mobile device, wherein, detecting that the contact's mobile device is within the geo-fence comprises:
determining that the amount of time is less than a threshold period of time.

7. The method of claim 1, wherein defining the geo-fence based on the current location of the first mobile device comprises:
defining the geo-fence based on at least one of a population density associated with the current location of the first mobile device or property boundaries associated with the current location of the first mobile device current location.

8. The method of claim 6, wherein defining the geo-fence based on
the speed of travel associated with the current location of the first mobile device comprises determining that the speed is indicative of walking or of a moving car.

9. The method of claim 1, wherein notifying the first mobile device that the contact's mobile device is in proximity to the first mobile device comprises:
presenting a map that includes the first location and the second location.

10. The method of claim 1, wherein notifying the first mobile device that the contact's mobile device is in proximity to the first mobile device comprises:
presenting an indication of a travel route from the first location associated with the first mobile device to the second location associated with the contact's mobile device.

11. A non-transitory computer-readable medium storing instructions executable by a data processing device to perform operations comprising:
receiving a request to be notified when a contact's mobile device is in proximity to a first mobile device;
obtaining permission to receive information associated with the contact; receiving a first location corresponding to a current location of the first mobile device; receiving a second location corresponding to a current location of the contact's mobile device;

estimating, based on the first location and the second location, an amount of time needed for the first mobile device to travel to a location of the contact's mobile device;

determining that the contact's mobile device is in proximity to the first mobile device including:

defining a geo-fence based on a current location of the first mobile device, a speed of travel associated with the current location of the first mobile device, a direction of travel associated with the current location of the first mobile device, a distance between the first mobile device and the contact's mobile device, and a travel route of the first mobile device, and detecting that the contact's mobile device is within the gee-fence; when the amount of time is less than a threshold period of time; and providing a notification that the contact's mobile device is in proximity to the first mobile device.

12. The medium of claim 11, wherein the information associated with the contact comprises at least one of location information, device information, or context information.

13. The medium of claim 11, the operations comprising estimating, based on a distance between the first location and the second location, an amount of time needed for the first mobile device to travel to a location of the contact's mobile device.

14. The medium of claim 11, comprising estimating, based on a distance between the first location and the second location, an amount of time needed for the first mobile device to travel to a location of the contact's mobile device based on available routes connecting the first mobile device and the contact's mobile device.

15. The medium of claim 11, wherein the proximity is based on a direction of travel of the contact's mobile device.

16. The medium of claim 11, comprising estimating, based on a distance between the first location and the second location, an amount of time needed for the first mobile device to travel to a location of the contact's mobile device, wherein, detecting that the contact's mobile device is within the geo-fence comprises:

determining that the amount of time is less than a threshold period of time.

17. The medium of claim 11, wherein defining the geo-fence based on the current location of the first mobile device comprises:

defining the geo-fence based on at least one of a population density associated with the current location of the first mobile device or property boundaries associated with the current location of the first mobile device current location.

18. The medium of claim 16, wherein defining the geo-fence based on the speed of travel associated with the first mobile device comprises determining that the speed is indicative of walking or of a moving car.

19. The medium of claim 11, wherein providing the notification that the contact's mobile device is in proximity to the first mobile device comprises:

presenting a map that includes the first location and the second location.

20. The medium of claim 11, wherein providing the notification that the contact's mobile device is in proximity to the first mobile device comprises:

presenting an indication of a travel route from the first location associated with the first mobile device to the second location associated with the contact's mobile device.

21. A system, comprising:

one or more computers; and computer-readable medium coupled to the one or more computers having instructions stored thereon which, when executed by the one or more computers, cause the one or more computers to perform operations comprising:

receiving a request from a first mobile device to be notified when a contact's mobile device is in proximity to the first mobile device;

obtaining permission to receive information associated with the contact; receiving a first location corresponding to a current location of the first mobile device;

receiving a second location corresponding to a current location of the contact's mobile device;

estimating, based on the first location and the second location, an amount of time needed for the first mobile device to travel to a location of the contact'~mobile device;

determining that the contact's mobile device is in proximity to the first mobile device, including:

defining a geo-fence based on a current location of the first mobile device, a speed of travel associated with the current location of the first mobile device, a direction of travel associated with the current location of the first mobile device, a distance between the first mobile device and the contact's mobile device, and a travel route of the first mobile device, and detecting that the contact's mobile device is within the geo-fence; when the amount time is than a threshold period of time; and providing a notification that the contact's mobile device is in proximity to the first mobile device.

* * * * *

UNITED STATES PATENT AND TRADEMARK OFFICE
CERTIFICATE OF CORRECTION

| | | |
|---|---|---|
| PATENT NO. | : 9,002,380 B2 | Page 1 of 1 |
| APPLICATION NO. | : 13/492759 | |
| DATED | : April 7, 2015 | |
| INVENTOR(S) | : Alessandro F. Sabatelli and Ronald K. Huang | |

It is certified that error appears in the above-identified patent and that said Letters Patent is hereby corrected as shown below:

In the claims,

Column 11, Line 62 at Claim 1; replace:
"ity to the first mobile device, including: defining a gee-" with
-- ity to the first mobile device, including: defining a geo- --

Column 13, Line 5 at Claim 11; replace:
"ity to the first mobile device including" with
-- ity to the first mobile device, including --

Column 13, Line 13 at Claim 11; replace:
"mobile device is within the gee-fence; when the amount" with
-- mobile device is within the geo-fence; when the amount --

Column 14, Line 34 at Claim 21; replace:
"to travel to a location of the contact'~mobile device" with
-- to travel to a location of the contact's mobile device --

Column 14, Line 44 at Claim 21; replace:
"mobile device is within the geo-fence; when the amount" with
-- mobile device is within the geo-fence; when the amount of --

Column 14, Line 45 at Claim 21; replace:
"time is than a threshold period of time; and" with
-- time is less than a threshold period of time; and --

Signed and Sealed this
Thirteenth Day of October, 2015

Michelle K. Lee
*Director of the United States Patent and Trademark Office*